United States Patent
Liu et al.

(10) Patent No.: US 9,755,747 B2
(45) Date of Patent: Sep. 5, 2017

(54) OPTICAL SIGNAL PROCESSING APPARATUS AND DECODING METHOD FOR OPTICAL SIGNAL RECEPTION CONTROL DEVICE

(71) Applicant: KUANG-CHI INNOVATIVE TECHNOLOGY LTD., Shenzhen (CN)

(72) Inventors: Ruopeng Liu, Shenzhen (CN); Lin Luan, Shenzhen, CA (US); Chunlai Li, Shenzhen (CN); Min Liu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 188 days.

(21) Appl. No.: 14/621,402

(22) Filed: Feb. 13, 2015

(65) Prior Publication Data

US 2015/0162984 A1 Jun. 11, 2015

Related U.S. Application Data

(63) Continuation of application No. PCT/CN2013/081414, filed on Aug. 13, 2013.

(30) Foreign Application Priority Data

Aug. 13, 2012 (CN) .......................... 2012 1 0286682
Aug. 31, 2012 (CN) .......................... 2012 1 0316807

(Continued)

(51) Int. Cl.
H04B 10/00 (2013.01)
H04B 10/2575 (2013.01)
G08C 23/04 (2006.01)

(52) U.S. Cl.
CPC ......... *H04B 10/2575* (2013.01); *G08C 23/04* (2013.01)

(58) Field of Classification Search
CPC ...... G08C 23/04; H04B 10/2575; G06F 21/44
See application file for complete search history.

(56) References Cited

U.S. PATENT DOCUMENTS 3,872,435 A * 3/1975 Cestaro .............. G07C 9/00119
340/5.64
5,195,016 A * 3/1993 Powers .................. H01H 47/24
315/159

(Continued)

FOREIGN PATENT DOCUMENTS

CN 2263693 Y 10/1997
CN 1187722 A 7/1998

(Continued)

*Primary Examiner* — Ken N Vanderpuye
*Assistant Examiner* — Amritbir Sandhu
(74) *Attorney, Agent, or Firm* — Perkins Coie LLP

(57) ABSTRACT

The present invention provides an optical signal processing device and a decoding method for an optical signal reception control device. The optical signal processing device includes one of the following: a power control apparatus, where the power control apparatus is configured to control power-on and power-off of a power supply according to an optical signal, or, a clock apparatus, where the clock apparatus is configured to store time of opening and closing a door; or, a charging apparatus, where the charging apparatus is configured to charge an optical signal transmitting apparatus. The present invention can control power-on and power-off of a power supply automatically and save electric energy effectively.

18 Claims, 6 Drawing Sheets

| (30) | Foreign Application Priority Data | |
|---|---|---|
| Aug. 31, 2012 | (CN) | 2012 1 0317181 |
| Nov. 16, 2012 | (CN) | 2012 1 0464891 |
| Nov. 19, 2012 | (CN) | 2012 1 0468070 |

(56) References Cited

U.S. PATENT DOCUMENTS

| | | | | |
|---|---|---|---|---|
| 8,310,159 B2* | 11/2012 | Bigge | H05B 37/02 | 315/119 |
| 9,235,701 B2* | 1/2016 | Wu | G06F 21/44 | |
| 2002/0171639 A1* | 11/2002 | Ben-David | G06F 3/1454 | 345/207 |
| 2008/0253766 A1* | 10/2008 | Yu | H04B 10/1143 | 398/41 |
| 2009/0127461 A1* | 5/2009 | Holcombe | H04B 10/116 | 250/338.1 |
| 2013/0300216 A1* | 11/2013 | Chen | H01H 47/00 | 307/131 |
| 2015/0146871 A1* | 5/2015 | Liu | H04L 9/0852 | 380/256 |
| 2015/0162984 A1* | 6/2015 | Liu | G08C 23/04 | 398/115 |
| 2015/0188633 A1* | 7/2015 | Liu | H04B 10/116 | 398/118 |
| 2016/0164604 A1* | 6/2016 | Liu | H04B 10/116 | 398/118 |

FOREIGN PATENT DOCUMENTS

| | | | |
|---|---|---|---|
| CN | 2382158 | Y | 6/2000 |
| CN | 1676843 | A | 10/2005 |
| CN | 101226593 | A | 7/2008 |
| CN | 101350111 | A | 1/2009 |
| CN | 101366637 | A | 2/2009 |
| CN | 101557332 | A | 10/2009 |
| CN | 201539152 | U | 8/2010 |
| CN | 201554280 | U | 8/2010 |
| CN | 201666040 | U | 12/2010 |
| CN | 102479398 | A | 5/2012 |
| CN | 102610013 | A | 7/2012 |
| CN | 102693567 | A | 9/2012 |
| CN | 102694597 | A | 9/2012 |
| CN | 102708607 | A * | 10/2012 |
| CN | 102750760 | A | 10/2012 |
| CN | 102831678 | A | 12/2012 |
| CN | 103021050 | A | 4/2013 |
| CN | 103021051 | A | 4/2013 |
| GB | 1529789 | | 10/1978 |
| WO | 2012004734 | A1 | 1/2012 |

* cited by examiner

OPTICAL SIGNAL PROCESSING APPARATUS AND DECODING METHOD FOR OPTICAL SIGNAL RECEPTION CONTROL DEVICE

CROSS REFERENCE TO RELATED APPLICATIONS

This application is a continuation of PCT/CN2013/081414 filed on Aug. 13, 2013, which claims priority to Chinese patent application No. 201210286682.8 of Aug. 13, 2012; Chinese patent application No. 201210316807.7 of Aug. 31, 2012; Chinese patent application No. 201210317181.1 of Aug. 31, 2012; Chinese patent application No. 201210464891.7 of Nov. 16, 2012; and Chinese patent application No. 201210468070.0 of Nov. 19, 2012, which are all incorporated herein by reference.

TECHNICAL FIELD

The disclosure relates to the field of light communication, and in particular, to an optical signal processing device and a decoding method for an optical signal reception control device, where the optical signal processing device relates to an intelligent light-controlled door lock, a power control module, a intelligent light-controlled door lock, a photoelectric trigger circuit, an optical signal reception control device, a light-controlled intelligent lock, an optical signal receiving apparatus, an optical signal transmitting apparatus, and a light communication system.

BACKGROUND

An access control system is a system that controls an entrance and exit, and is developed on the basis of a conventional door lock. A conventional mechanical door lock is a pure mechanical apparatus. No matter how reasonable a structure is designed and how sturdy a material is, people can always open the lock by various means. For an entrance (of an office building or hotel rooms) visited by many people, key management is troublesome. Once a key is lost or a keeper of the key is changed, the key and its lock need to be changed together. To solve such problems, an electronic magnetic-card lock and an electronic coded lock emerge. Problems of an electronic magnetic-card lock are that information can be easily copied, abrasion between a card and a card reader is great, a fault ratio is high, and a security coefficient is low; and a problem of an electronic coded lock is that a code is vulnerable to leakage and hardly traceable, which leads to a very low security coefficient. In addition, most of such products at that age combine a card reading part (code input) with a control part, and are installed outside a door, so that people can unlock outdoors easily. In recent years, with the development of proximity card technologies and biometric recognition technologies, systems based on various technologies such as a proximity card-type access control system and a fingerprint access control system emerge. However, a proximity card-type access control system is complicated to operate, and a fingerprint access control system has disadvantages such as a fingerprint vulnerable to theft, a client end vulnerable to damage, and a low recognition ratio.

To solve such problems, a light-controlled access control system arises. The light-controlled access control system generally includes a light-controlled client end and an intelligent light-controlled door lock. The light-controlled client end is used to transmit an optical signal that includes unlock code information, and the intelligent light-controlled door lock parses the optical signal after receiving the optical signal; and, if the optical signal includes an unlock code, controls the door lock to open; otherwise, controls the door lock to close. However, an infrared sensing module is added to an existing light-controlled door lock. When somebody approaches the door, a power supply of the intelligent light-controlled door lock is turned on, so as to save electricity. However, the infrared sensing module is instable. If a fault occurs, the intelligent light-controlled door lock cannot be opened or closed. In addition, frequent turn-on and turn-off of the infrared sensing module increase power consumption of the intelligent light-controlled door lock, which is not energy-efficient or environment-friendly.

In addition, in order to save energy and reduce power consumption of electronic products, a body sensing module for controlling a power supply is generally disposed in many existing electronic products. When somebody approaches the product, the body sensing module outputs a high level; and, when nobody approaches the product, the body sensing module outputs a low level, thereby implementing automatic turn-on and turn-off of the electronic products.

For example, an existing pyroelectric far infrared lamp switching module is formed of an infrared sensing controller, a light sensing circuit, a Fresnel lens, a silicon-controlled rectifier trigger circuit capable of having a latency, and the like. An integrated circuit includes a pyroelectric infrared sensor, a two-level operational amplifier, a comparer, a latency timer, zero-crossing detection, and a drive circuit. When a person enters a sensing scope of the switching module, the sensor senses the change of infrared light spectrum of a human body, and the switch turns on a load automatically. When the person stays in the sensing scope, the switch keeps on. Once the person leaves the sensing scope, the switch turns off the load automatically after a little of latency.

Specifically, a human body is a body that emits an infrared ray of a specific wavelength. The body sensing controller can sense proximity of a human body. When a person enters a monitored area, the human body emits a 7~9 μm infrared ray, which is received by an infrared sensor after being up-converted by the Fresnel lens. The infrared sensor detects the change of infrared heat caused by movement of the human body, and converts the infrared heat into an amount of voltage. After undergoing two-level frequency selection, amplification and comparison, the voltage is input into a control circuit, and the control circuit outputs a zero-crossing pulse to trigger turn-on of a bidirectional silicon-controlled rectifier. In the daytime or when the light is bright, a photosensitive component is in a low-resistance state and triggers no voltage output, the bidirectional silicon-controlled rectifier is cut off and the lamp stay in the off state. At night or when the light is dim, the photosensitive component is in a high-resistance state, and a right of turning on is granted to an input end, which is an output end of the infrared sensing controller. At this time, if a person enters the monitored area, the bidirectional silicon-controlled rectifier is triggered to turn on, and the lamp is powered on; and, when the human body leaves the monitored area, the signal of the silicon-controlled rectifier is triggered to delay for a set time and then the silicon-controlled rectifier is turned off, and the lamp is powered off, which accomplishes automatic turn-off. However, the existing body sensing module has many problems. For example, the load current is too high, the power consumption is too high, and the output voltage is instable, especially when it is applied to security-monitoring products. The security-monitoring products impose high requirements on intelligent control, and a fault occurs once the infrared sensing is insensitive.

In addition, a wireless light communications technology is also called visible light communication, where communication is performed by flashing an LED light source at a high frequency, presence of light indicates 1, and absence of light indicate 0, and a transmission rate can reach a maximum of gigabits per second. In the wireless light communications technology, data is unlikely to be interfered with or captured, and an optical communication device can be easily made and are unlikely to be damaged or degaussed. Therefore, the wireless light communications technology can be used to make a wireless optical encryption key. Compared with microwave technologies, the wireless light communication has abundant spectrum resources, which is incomparable with general microwave communication and wireless communication. In addition, the visible light communication is applicable to any communications protocol, and is suitable for any environment. In terms of security, in contrast to conventional magnetic materials, there is no need to worry about a problem of degaussing, or even to worry about that communication content is intercepted; and optical wireless communication equipment features flexible and convenient installation and layout, and low costs, and is applicable to large-scale popularity and application.

An access control system is a system that controls an entrance and exit, and is developed on the basis of a conventional door lock. A conventional mechanical door lock is a pure mechanical apparatus. No matter how reasonable a structure is designed and how sturdy a material is, people can always open the lock by various means. For an entrance (of an office building or hotel rooms) visited by many people, key management is troublesome. Once a key is lost or a keeper of the key is changed, the key and its lock need to be changed together. To solve such problems, an electronic magnetic-card lock and an electronic coded lock emerge. Problems of an electronic magnetic-card lock are that information can be easily copied, abrasion between a card and a card reader is great, a fault ratio is high, and a security coefficient is low; and a problem of an electronic coded lock is that a code is vulnerable to leakage and hardly traceable, which leads to a very low security coefficient. In addition, most of such products at that age combine a card reading part (code input) with a control part, and are installed outside a door, so that people can unlock outdoors easily. In recent years, with the development of proximity card technologies and biometric recognition technologies, systems based on various technologies such as a proximity card-type access control system and a fingerprint access control system emerge. However, a proximity card-type access control system is complicated to operate, and a fingerprint access control system has disadvantages such as a fingerprint vulnerable to theft, a client end vulnerable to damage, and a low recognition ratio.

To solve the foregoing problems, a light-controlled access control system arises. The light-controlled access control system generally includes an optical signal transmitting apparatus and an optical signal reception control device. The optical signal transmitting apparatus is used to transmit an optical signal that includes unlock code information, and the optical signal reception control device parses the optical signal after receiving the optical signal; and, if the optical signal includes an unlock code, controls the door lock to open; otherwise, controls the door lock to close. The optical signal reception control device uses a dry battery as a power supply, and consumes much electricity. The battery needs to be changed often, which causes inconvenience of use. Overuse of the dry battery also causes environment pollution. Therefore, how to perform energy-saving for the optical signal reception control device becomes an urgent issue to be solved for a light-controlled access control system.

Initially in the coding of an optical signal transmitting apparatus, the number of high levels represents a signal. Each high level lasts about 2 ms. Each group includes at most four high levels. The number of levels in each group represents a 2-bit signal. For example, when the number of high levels in a group of signals is 1, it represents 00; when the number of high levels is 2, it represents a signal 01; when the number of high levels is 3, it represents a signal 10; and, when the number of high levels is 4, it represents a signal 11. A low-level latency is used to distinguish between different groups of signals, where the low-level latency is about 30 ms.

Both the high level and the low level have a specific latency. Therefore, when receiving a signal, the optical signal reception control device may decode the received signal by detecting a high-level and low-level latency on an I/O pin of its control unit. Using a level rising edge as a start of a high level, timing begins when a rising edge is detected. When the high level lasts for more than 1.5 us, the signal is regarded as a valid signal, and the number of high levels is recorded. Using a falling edge as a start of a low level, timing begins when the I/O pin detects the falling edge. When the low level lasts for more than 20 ms, it is deemed an end of a group of signals. When the low level of the I/O pin lasts for more than 75 ms, it is considered that the signal receiving is complete or interrupted, and signal detection resumes.

A decoding method corresponding to the foregoing existing encoding method needs to output and detect relatively many high levels, which leads to signal inability. In addition, the overall sending time and receiving time of the signal are relatively long, and the data transmission is slow.

In addition, a coded lock access control technology is widely used by enterprises. In a coded lock-based access control technology, a code of the coded lock is written into an RFID (Radio Frequency Identification, radio frequency identification) card. When the user makes the RFID card approach a sensing area of the coded lock, the RFID card sends unlock information to the coded lock automatically. After receiving the signal, the coded lock is unlocked if the authentication succeeds.

In the prior art, based on a linear transmission feature of an optical signal, due to stronger confidentiality in contrast to a radio frequency signal, the light communication arises in an access control system. In such access control systems, a decoding unit disposed inside or outside a door receives an optical signal, and, according to the received optical signal, controls unlocking of the door lock disposed inside in the door. However, such door lock has no clock function. Therefore, the user is unable to query the time of opening or closing the door, which reduces user experience.

In addition, an access control controller is used to provide a power supply for an optical signal receiving apparatus and control turn-on and turn-off of an unlocking device. Therefore, the design structure of the entire optical signal receiving apparatus is non-detachable. The optical signal receiving apparatus is generally powered by a battery pack formed of series-connected alkaline batteries. The user needs to change batteries periodically, which leads to environment pollution and brings inconvenience to the user. In addition, the optical signal transmitting apparatus is portable, and the user may carry it along. The optical signal transmitting apparatus is powered by a dry battery. If the dry battery is power-interrupted abruptly, the user is unable to use the optical signal transmitting apparatus to perform the action of opening a door properly.

SUMMARY

The present invention provides an optical signal processing device and a decoding method for an optical signal reception control device, so as to at least solve technical problems in the prior art.

According to an aspect of the present invention, an optical signal processing device is provided, including one of the following: a power control apparatus, where the power control apparatus is configured to control power-on and power-off of a power supply according to an optical signal, or, a clock apparatus, where the clock apparatus is configured to store time of opening and closing a door; or, a charging apparatus, where the charging apparatus is configured to charge an optical signal transmitting apparatus.

According to another aspect of the present invention, a decoding method for an optical signal reception control device is provided, including the following steps: M1. using a rising edge of a signal as a start part of a high level, starting, by a control unit of the optical signal reception control device, timing after detecting the rising edge, and when duration of the high level is greater than first preset duration, recording, by the control unit, the number of high levels; and M2. Using a falling edge of a signal as a start part of a low level, starting, by the control unit of the optical signal reception control device, timing when detecting the falling edge, and when duration of the low level is greater than second preset duration, automatically recording, by the control unit, an end of a group of signals.

In the technical solutions of this application, the following beneficial effects can be achieved:

1) The present invention provides an intelligent light-controlled door lock, where the door lock can sense visible light information by using a light sensing module, and further control power-on and power-off of a power supply automatically and save electric energy effectively.

2) The present invention provides a power control module and a intelligent light-controlled door lock, where a photodiode, a signal amplifier and a field effect transistor that work with each other are disposed, and the optical signal discharges electricity to generate a trigger signal and control a power switch, and therefore, the circuit design is more reasonable, problems such as a large current or an instable output voltage are solved, and current consumption is reduced.

3) The present invention provides a photoelectric trigger circuit, the photoelectric trigger circuit is added to an optical signal reception control device, and therefore, a power supply unit of the optical signal reception control device is powered on when receiving a light pulse signal, and is in a sleep state when there is no light pulse signal, thereby reducing power consumption. The optical signal reception control device with the photoelectric trigger circuit is energy-saving and environment-friendly. In addition, the present invention further provides a decoding method for an optical signal reception control device, and an optical signal transmitting apparatus is decrypted by using this method after being encrypted, which reduces signal decoding time and improves security performance of the optical signal reception control device.

4) The present invention provides a light-controlled intelligent lock with a clock function. Because a controller is connected to a real-time clock and a memory, the controller can, by controlling the clock, record and store the time of opening and closing a door, which facilitates query by a user and improves user experience.

5) The present invention provides an optical signal receiving apparatus with a power supply function, an optical signal transmitting apparatus with a charging function, and a light communication system formed by the two. When being power-interrupted, the optical signal transmitting apparatus can be charged by using an optical signal receiving apparatus with a corresponding charging interface, and implement the function of unlocking, thereby improving user experience.

Certainly, when any solution to this application is implemented, all advantages described above are not necessarily demonstrated simultaneously.

BRIEF DESCRIPTION OF DRAWINGS

The accompanying drawings described herein are intended for better understanding of the present invention, and constitute a part of this application. Exemplary embodiments and descriptions thereof in the present invention are intended to interpret the present invention and do not constitute any improper limitation on the present invention. In the accompanying drawings:

FIG. 2-1 is a principle block diagram of a intelligent light-controlled door lock excluding a power control module and a power supply according to Embodiment 2 of the present invention;

FIG. 2-2 is a principle block diagram of the optical signal receiving module according to Embodiment 2 shown in FIG. 2-1 of the present invention;

FIG. 2-3 is a principle block diagram of an equilibrium shaping module according to Embodiment 2 shown in FIG. 2-1 of the present invention;

FIG. 2-4 is a principle block diagram of a decoding module according to Embodiment 2 shown in FIG. 2-1 of the present invention;

FIG. 2-5 is a circuit diagram when a power control module collaborates with a power supply according to Embodiment 2 of the present invention;

FIG. 2-6 is a principle block diagram of a second example according to Embodiment 2 of the present invention;

FIG. 3-1 is a schematic diagram of a photoelectric trigger circuit according to Embodiment 3 of the present invention;

FIG. 3-2 is a schematic diagram of an optical signal reception control device according to Embodiment 3 of the present invention;

FIG. 3-3 is a step-by-step flowchart of a decoding method for an optical signal reception control device according to Embodiment 3 of the present invention;

FIG. 3-4 is a schematic diagram of signals in a first example according to Embodiment 3 of the present invention; and FIG. 3-5 is a schematic diagram of signals in a second example according to Embodiment 3 of the present invention.

EMBODIMENTS

The following describes the present invention in detail with reference to accompanying drawings and embodiments. It should be noted that the embodiments in this application and features in the embodiments may be combined with each other without conflicts.

Figure 1:
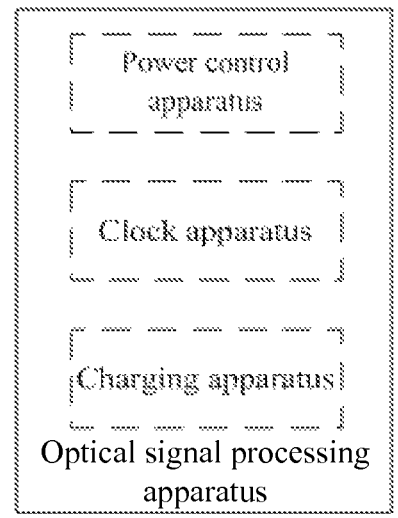
FIG. 1-1 is a schematic structural diagram of an optical signal processing device according to an embodiment of the present invention.

As shown in FIG. 1-1, in an embodiment of the present invention, an optical signal processing device is provided, including one of the following: a power control apparatus, where the power control apparatus is configured to control power-on and power-off of a power supply according to an optical signal, or, a clock apparatus, where the clock apparatus is configured to store time of opening and closing a door; or, a charging apparatus, where the charging apparatus is configured to charge an optical signal transmitting apparatus.

Further, the optical signal processing device is a intelligent light-controlled door lock, where the intelligent light-controlled door lock includes the power supply, a power control module, an optical signal receiving module, and a microprocessor module; the power supply is configured to provide electric energy; the power control module is the power control apparatus, and the power control module includes a photodiode, a signal amplifier, and a field effect transistor; the photodiode is configured to sense the optical signal and generate a current signal, the signal amplifier is configured to amplify the current signal, and the field effect transistor is configured to control power-on and power-off of the power supply according to the amplified current signal; the optical signal receiving module is configured to convert an optical signal, which is transmitted by a light-controlled key and includes ID information, into an electric signal; and the microprocessor module is configured to control opening or closing of a door lock according to the electric signal.

Further, the intelligent light-controlled door lock further includes a protocol conversion module, and the protocol conversion module is configured to perform protocol conversion for the ID, and then transmit the ID to a host computer. Further, the intelligent light-controlled door lock further includes a signal demodulation module, and the signal demodulation module is configured to demodulate a signal output by the optical signal receiving module, and transmit the signal to the microprocessor module. Further, the intelligent light-controlled door lock further includes a decoding module, and the decoding module is configured to decode a digital signal of a CMI code transmitted by the optical signal receiving module into a digital signal of an NRZ code. Further, the intelligent light-controlled door lock further includes an equilibrium shaping module, and the equilibrium shaping module is configured to eliminate inter-symbol interference and rectify a pulse waveform for the signal output by the optical signal receiving module. Further, the equilibrium shaping module includes an operational amplifier and a comparer that are electrically connected to each other, where an input end of the operational amplifier and an input end of the comparer are both electrically connected to an output end of the optical signal receiving module, and an output end of the comparer is electrically connected to the decoding module. Further, the optical signal receiving module includes a photodiode, a signal amplifier, and a bandpass filter, where the photodiode and the bandpass filter are both electrically connected to the signal amplifier. Further, the protocol conversion module is an RS232 interface or an RS232-to-USB interface.

In the solution to the power control module and the intelligent light-controlled door lock described above, a photodiode, a signal amplifier and a field effect transistor that collaborate with each other are disposed, and the optical signal discharges electricity to generate a trigger signal and control a power switch, and therefore, the circuit design is more reasonable, problems such as a large current or an instable output voltage are solved, and current consumption is reduced.

Further, the optical signal processing device is an optical signal reception control device, and the optical signal reception control device includes an optical signal receiving unit, a control unit connected to the optical signal receiving unit, a power supply unit connected to the control unit, and a photoelectric trigger circuit that is connected between the control unit and the power supply unit and configured to trigger power-on of the power supply unit of the optical signal reception control device, where the photoelectric trigger circuit is the power control apparatus, and the power supply is the power supply unit.

Further, the photoelectric trigger circuit includes: an optical-to-electrical conversion unit, configured to convert a light pulse into an electrical pulse signal; an isolator, configured to generate a potential difference by using the electrical pulse signal, and release an electrical signal; and an output end, configured to: according to the electrical signal, trigger power-on of the power supply unit of the optical signal reception control device, where the optical signal is the light pulse. Further, the isolator is connected between the optical-to-electrical conversion unit and the output end. Further, the optical-to-electrical conversion unit is a photodiode. Further, the isolator is a DC blocking capacitor. Further, the output end is a conductor.

Further, the optical signal reception control device further includes a signal amplification circuit that connects the isolator and the output end. Further, the signal amplification circuit includes a first triode and a second triode connected to the first triode.

Further, the optical-to-electrical conversion unit is connected to one end of the isolator, and the other end of the isolator is connected to a base of the first triode, an emitter of the first triode is connected to a base of the second triode, both the emitter of the first triode and an emitter of the second triode are grounded, and a collector of the second triode is connected to the output end. Further, when illuminance is greater than or equal to 100 Lux and lasts for 1 ms or more, the light pulse triggers power-on of the power supply unit of the optical signal reception control device. Further, the power supply unit includes a power supply circuit and a battery. Further, the battery includes a nickel-cadmium battery or a nickel metal hydride battery or a lithium battery. Further, the optical-to-electrical conversion unit is a photodiode. Further, the optical signal receiving unit is a photodiode. Further, the optical signal reception control device further includes a demodulation unit configured to demodulate a visible optical signal. Further, the demodulation unit is a demodulation circuit. Further, the optical signal reception control device is an optical intelligent lock, an electrical lock, an industrial device, a locker, or an office device.

In the solution described above, a photoelectric trigger circuit is added to an optical signal reception control device, and therefore, a power supply unit of the optical signal reception control device is powered on when receiving a light pulse signal, and is in a sleep state when there is no light pulse signal, thereby reducing power consumption. The optical signal reception control device with the photoelectric trigger circuit is energy-saving and environment-friendly. In addition, the present invention further provides a decoding method for an optical signal reception control device, and an optical signal transmitting apparatus is decrypted by using this method after being encrypted, which reduces signal decoding time and improves security performance of the optical signal reception control device.

In addition, in an embodiment of the present invention, a decoding method for an optical signal reception control device is provided, including the following steps: M1. using a rising edge of a signal as a start part of a high level, starting, by a control unit of the optical signal reception control device, timing after detecting the rising edge, and when duration of the high level is greater than first preset duration, recording, by the control unit, the number of high levels; and M2. Using a falling edge of a signal as a start part of a low level, starting, by the control unit of the optical signal reception control device, timing when detecting the falling edge, and when duration of the low level is greater than second preset duration, automatically recording, by the control unit, an end of a group of signals.

Further, the decoding method for the optical signal reception control device further includes: M3. calculating, by the control unit of the optical signal reception control device, a period of each group of signals by using a synchronization clock, and identifying a low-level signal according to the period of each group of signals. Further, when a high-level signal occurs in a first preset time segment after completion of a group of signals, the optical signal reception control device rectifies a clock according to time of the high-level signal, and records the high-level signal into a next group of signals automatically. Further, when no high-level signal occurs in a second preset time segment after completion of a group of signals, the optical signal reception control device determines that a received signal is a low-level signal of a next group of signals. Further, the decoding method is applicable to decoding of a stroboscopic visible optical signal emitted by an optical signal transmitting apparatus or a mobile phone. Further, meanings represented by the number of high levels and low levels of each group of signals recorded by the optical signal reception control device are defined according to a coding scheme of the visible optical signal sent by the optical signal transmitting apparatus. Further, when duration of the low-level signal is greater than third preset duration, receiving of the signal is complete or receiving of the signal is interrupted, and the control unit of the optical intelligent lock restarts detecting signals.

Embodiment 2

Example 2-1

Figures 1, 2:
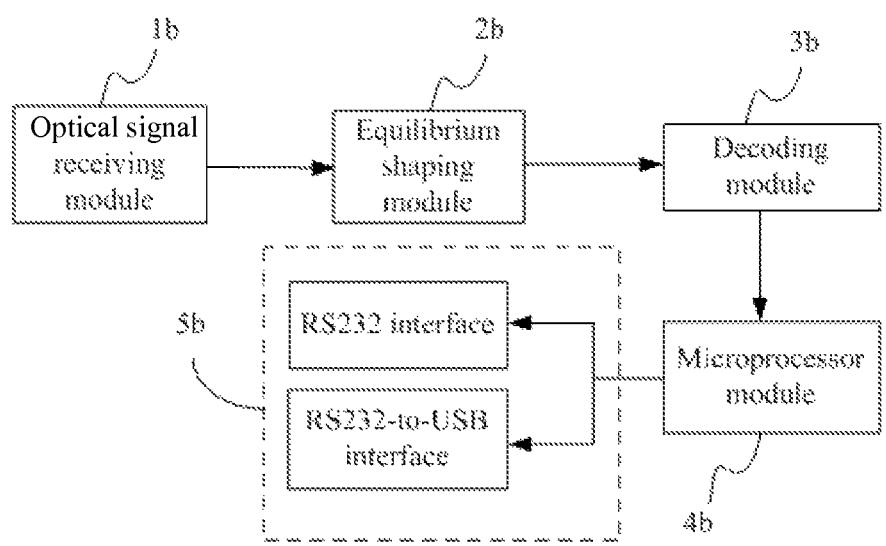
Figure 2:
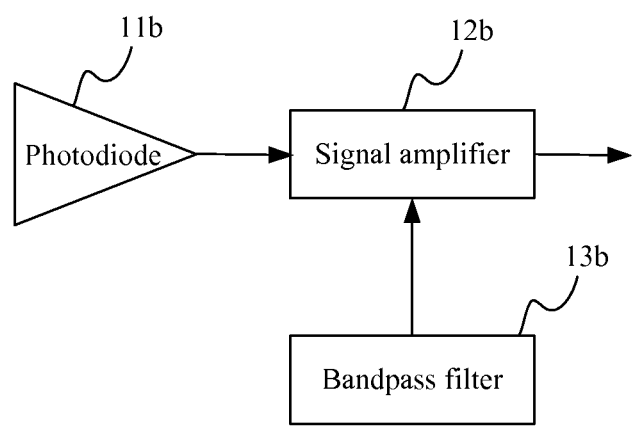

Referring to FIG. 2-1 and FIG. 2-2, a intelligent light-controlled door lock in this example includes an optical signal receiving module 1b, an equilibrium shaping module 2b, a decoding module 3b, a microprocessor module 4b, a protocol conversion module 5b, a power supply VCC, and a power control module. The power supply VCC is configured to provide electric energy. The optical signal receiving module 1b is configured to convert an optical signal, which is transmitted by a light-controlled key and includes ID information and code information, into an electric signal, where a code type of the optical signal transmitted by the light-controlled key is CMI code. The optical signal receiving module 1b includes a photodiode 11b, a signal amplifier 12b, and a bandpass filter 13b, where the photodiode 11b and the bandpass filter 13b are both electrically connected to the signal amplifier 12b. In this example, the photodiode 11b is an avalanche photodiode, and the signal amplifier 12b is a transimpedance amplifier.

The avalanche photodiode is a light detecting diode of a p-n structure. It uses an avalanche multiplication effect of a carrier to amplify a photoelectric signal to improve detection sensitivity. Therefore, compared with a vacuum photomultiplier, the avalanche photodiode has advantages such as a small size and no need of high-voltage power supplies, and is more suitable for practical application. Compared with an ordinary semiconductor photodiode, the avalanche photodiode has advantages such as high sensitivity and high speed. The transimpedance amplifier has advantages such as a stable gain, a wide dynamic range, and a wide band.

Figures 2, 3:
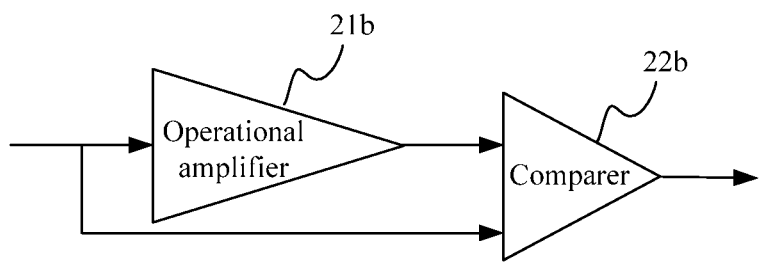

Referring to FIG. 2-3, the equilibrium shaping module 2b is configured to eliminate intersymbol interference and rectify a pulse waveform for the signal output by the optical signal receiving module 1b. The equilibrium shaping module includes an operational amplifier 21b and a comparer 22b that are electrically connected to each other, where an input end of the operational amplifier 21b and an input end of the comparer 22b are both electrically connected to an output end of the signal amplifier 12b of the optical signal receiving module 1b, and an output end of the comparer 22b is electrically connected to the decoding module 3b.

Figures 2, 3, 4:
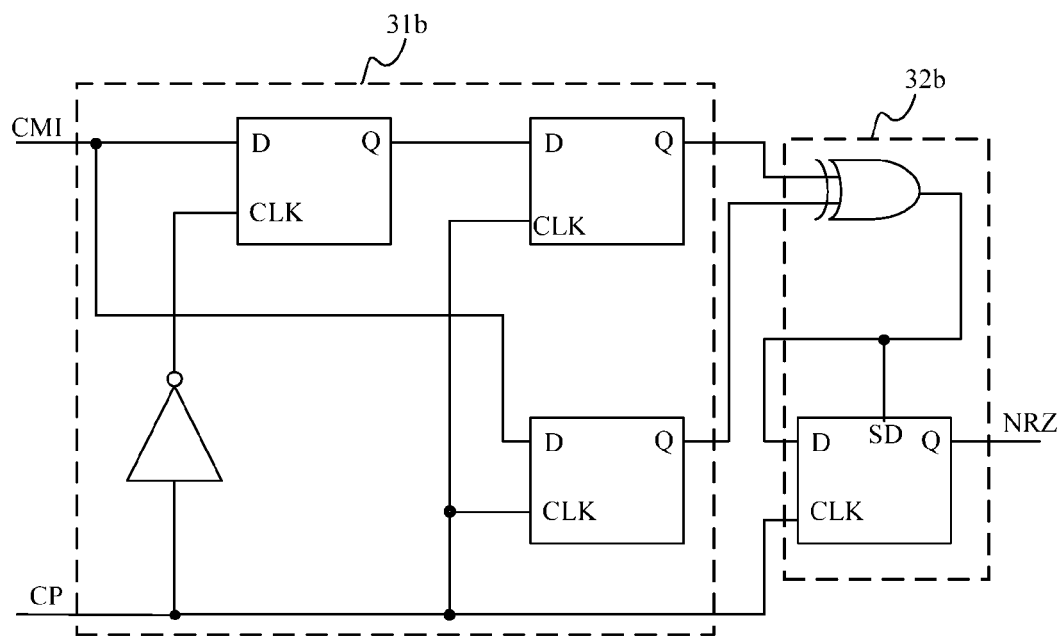
Figures 2, 3, 4, 5:
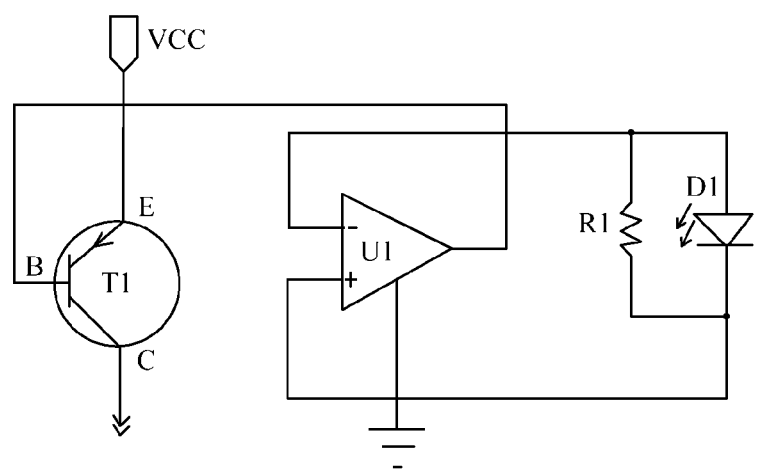
Figures 2, 3, 4, 5, 6:
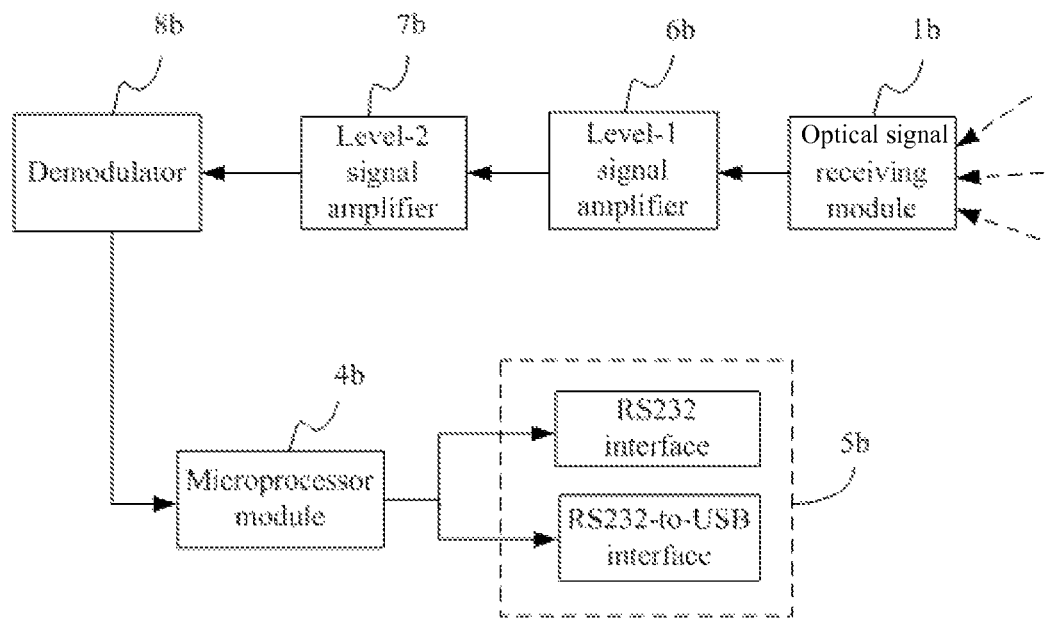
Figures 1, 3:
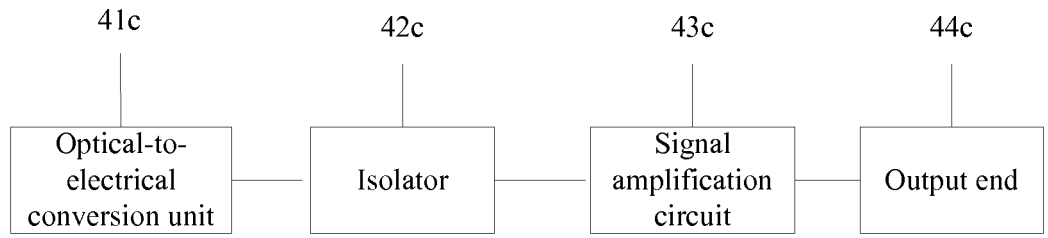
Figures 2, 3:
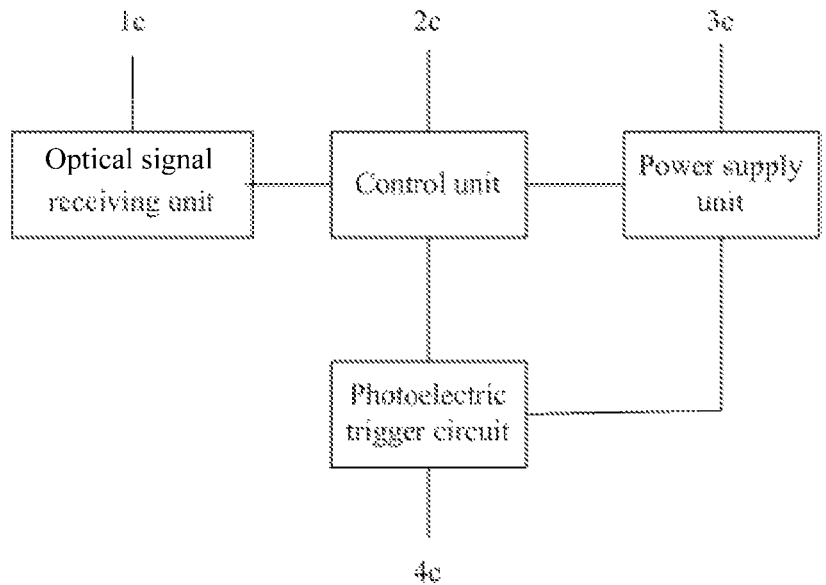
Figure 3:
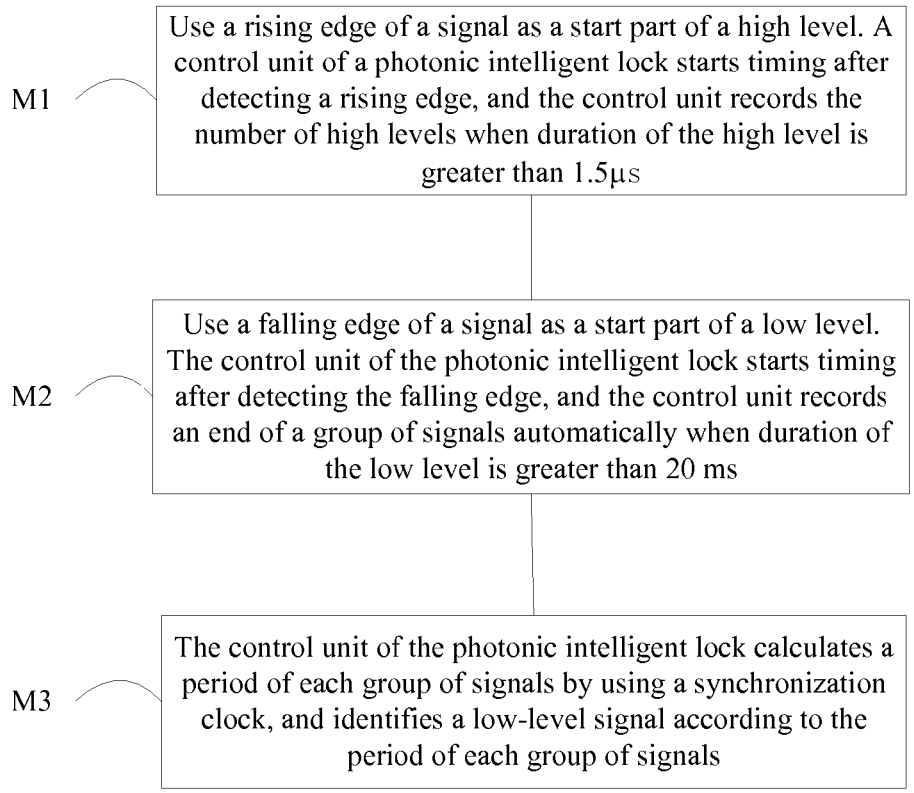
Figures 3, 4:
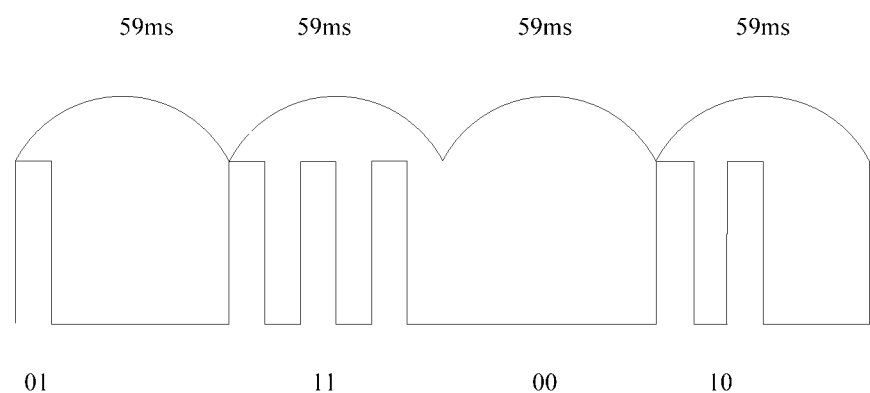
Figures 3, 4, 5:
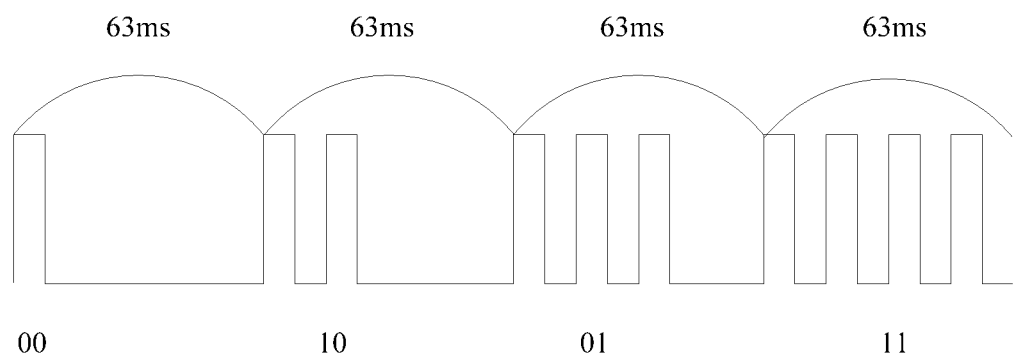

Referring to FIG. 2-4, the decoding module 3b is configured to decode a digital signal of a CMI code, which is shaped and transmitted by the optical signal receiving module 1b, into a digital signal of an NRZ code. The decoding module includes an upper- and lower-bit separating circuit 31b and a decoding operation circuit 32b, where the upper- and lower-bit separating circuit 31b is configured to separate an upper bit from a lower bit of a received CMI code, and the decoding operation circuit 32b is configured to perform an XNOR operation on the separated upper bit and lower bit of the CMI code.

Several D triggers are disposed in the upper- and lower-bit separating circuit 31b. A data input end D, a clock input end CLK, an inverting reset terminal SD, and a data output end Q are disposed in the D triggers. Under an effect of a clock CP, the input CMI code is latched by each D trigger. When a falling edge of the clock CP is reached (corresponding to a middle time point of the first bit of the CMI code at this time), the falling edge is inverted by a phase inverter into a rising edge. At this time, the D trigger outputs the value of the first bit of the CMI code, which is in a saved state, thereby implementing latching for the value of the first bit of the CMI code. After the time of a CMI code element width elapses, the rising edge of the clock CP is reached (corresponding to a middle time point of a second bit of the CMI code), and the D trigger outputs the value of the second bit of the CMI code. At the same time, the first latched bit of the CMI code enters a second D trigger, thereby implementing separation between two bits of the CMI code.

The decoding operation circuit 32b includes an XOR gate and a D trigger, where the XOR gate is connected to the output of the first bit and the second bit of the CMI code of the bit separating circuit, and NRZ is a decoding output. According to the CMI decoding principles, it can be learned that once an XNOR operation is performed on the first bit and the second bit of the CMI code, a corresponding NRZ code is obtained. Therefore, in this embodiment, the first bit and the second bit of the CMI code undergo an XOR gate first and then undergo a phase inverting operation to obtain a decoding output.

By using the decoding module 3b, the digital signal of the CMI code, which is transmitted by the optical signal receiving module 1b, is decoded into a digital signal of the NRZ code. Therefore, in this example, a light-controlled key that transmits a CMI code signal may be used together. The CMI code has the following advantages: (1) no direct-current component exists, and a low-frequency component is small;

(2) a very strong clock component exists in information stream, which facilitates extraction of clock information from the signal; and (3) a specific error correction capability exists. Therefore, a bit error rate of signal transmission can be reduced.

The microprocessor module 4b is configured to decrypt and authenticate the received digital signal of the NRZ code, and then control opening and closing of a door lock and transmit an ID transmitted by a light-controlled key to a host computer (not illustrated in the diagram) by using the protocol conversion module 5b. A microprocessor is disposed in the microprocessor module 4b, where the microprocessor may be a single-chip microcomputer, an FPGA, or a DSP. In this embodiment, the microprocessor is a single-chip microcomputer. The protocol conversion module 5b may be an RS232 interface or an RS232-to-USB interface. In this embodiment, the protocol conversion module 5b includes an RS232 interface and an RS232-to-USB interface that are parallel-connected to each other, which thus facilitates connection to a host computer that has an RS232 interface or an USB interface. By using the interface, protocol conversion may be performed for the ID output by the microprocessor module 4b, and therefore, the ID format of a Wiegand protocol is converted into a signal of an RS232 protocol, and the ID format of the Wiegand protocol is converted into a USB format, and then the ID is reported to the host computer.

Referring to FIG. 2-5, the power control module includes a photodiode D1, a signal amplifier U1, and a field effect transistor T1. The photodiode D1 is configured to sense an optical signal transmitted by a light-controlled key and generate a current signal, the signal amplifier U1 is configured to amplify the current signal, and the field effect transistor T1 is configured to control power-on and power-off of the power supply VCC according to the amplified current signal. In addition, the photodiode D1 is parallel-connected to a shunt resistor R1, thereby preventing a surge current, which is generated when the field effect transistor T1 is powered on or off, from burning out the photodiode D1. In this embodiment, a model of the photodiode D1 is SFH203P. It can receive light with a wavelength of 400 nm to 1100 nm. When a bias voltage is 1V, a dark current of the SFH203P is about 100 pA.

Example 2-2

Referring to FIG. 2-6, this example is similar to example 2-1. Similarities are: Both include an optical signal receiving module 1b, a microprocessor module 4b, a protocol conversion protocol 5b, a power supply VCC, and a power control module. Differences are: In this example, a level-1 signal amplifier 6b, a level-2 signal amplifier 7b, and a demodulator 8b that are electrically connected to each other consecutively are disposed between the optical signal receiving module 1b and the microprocessor module 4b. The level-1 signal amplifier 6b is configured to convert a current signal, which is output by the optical signal receiving module 1b, into a voltage signal, and amplify and output the voltage signal. The level-2 signal amplifier 7b is configured to further amplify the signal, which is output by the level-1 signal amplifier 6b, into a signal that is suitable for processing by the microprocessor module 4b. The demodulator 8b is configured to: in a sent ID format, demodulate the ID signal transmitted by the level-2 signal amplifier 7b, and transmit demodulated ID signal to a processor module 4b to undergo corresponding signal processing. The principles for controlling a door lock are the same as those in example 2-1, and details are not described herein again.

In conclusion, in this example, a photodiode D1, a signal amplifier U1 and a field effect transistor T1 that collaborate with each other are disposed, and the optical signal discharges electricity to generate a trigger signal and control a power switch, and therefore, the circuit design is more reasonable, problems such as a large current or an instable output voltage are solved, and current consumption is reduced.

The foregoing has described this example with reference to the accompanying drawings. However, the present invention is not limited to the manners described in the example. The manners described in the example are merely exemplary rather than restrictive. In light of the present invention, a person of ordinary skill in the art may develop many other manners without departing from principles of the present invention and the protection scope of the claims. For example, the photodiode 11b of the optical signal receiving module 1b and the photodiode D1 of the power control module are the same photodiode. All such manners fall within the protection scope of the present invention.

It should be noted that the present invention may independently protect solutions described in this embodiment, or protect a solution that combines one or more solutions in the solutions described in this embodiment with one or more solutions in the solutions described in other embodiments.

Embodiment 3

Refer to FIG. 3-1, which is a schematic structural diagram of a photoelectric trigger circuit in an exemplary embodiment. The photoelectric trigger circuit includes an optical-to-electrical conversion unit 41c configured to convert an optical signal into an electrical signal, an isolator 42c configured to impede a direct current, and an output end 44c configured to output a control signal. The optical-to-electrical conversion unit 41c receives a light pulse signal, and converts the light pulse into an electrical pulse signal. The electrical pulse signal leads to a potential difference between two ends of the isolator 42c. The isolator 42c discharges electricity, and the output end 44c outputs a signal to trigger power-on of a power supply unit of the optical signal reception control device.

The photoelectrical trigger circuit in this embodiment further includes a signal amplification circuit 43c. The signal amplification circuit 43c is an electrical signal amplification circuit, which includes a first triode and a second triode. According to an exemplary implementation manner of this embodiment, the optical-to-electrical conversion unit is connected to one end of the isolator 42c, and the other end of the isolator 42c is connected to a base of the first triode, an emitter of the first triode is connected to a base of the second triode, both the emitter of the first triode and an emitter of the second triode are grounded, and a collector of the second triode is connected to the output end. The output end is connected to the power supply unit. Certainly, the signal amplification circuit 43c may also be other forms of an electric signal amplification circuit.

It should be noted that the optical-to-electrical conversion unit 41c is a photodiode, or another apparatus capable of converting a visible optical signal into an electrical signal.

Working principles of a photoelectrical trigger circuit are: The optical-to-electrical conversion unit 41c receives a light pulse signal and converts the light pulse signal into an electrical pulse signal. The electrical pulse signal leads to a potential difference between two ends of the isolator 42c.

The isolator 42c discharges electricity, and the electric signal released by the isolator 42c is amplified by using the signal amplification circuit 43c. The output end 44c outputs the amplified signal to trigger power-on of a power supply unit of the optical signal reception control device. The power supply unit of the light-controlled lock in this embodiment is triggered by a low level. Therefore, a low level is output by the signal amplification circuit 43c, and the signal output by the output end 44c is a low-level signal, which can trigger power-on of the power supply unit. It should be understood that if the power supply unit is triggered by a high level, and a signal amplification circuit that outputs a high-level signal may also be used, and may output a high level to trigger power-on of the power supply unit.

It should be noted that when illuminance of the light pulse is greater than or equal to 100 Lux and lasts for 1 ms or more, the optical-to-electrical conversion unit 41c receives the light pulse signal and converts the light pulse signal into an electrical pulse signal. The electrical pulse signal leads to a potential difference between two ends of the isolator 42c. The isolator 42c discharges electricity, and the electric signal released by the isolator 42c is amplified by using the signal amplification circuit 43c. The output end 44c outputs the amplified signal to trigger power-on of a power supply unit of the optical signal reception control device, so that the power supply unit is started up.

In an exemplary embodiment of this embodiment, the illuminance of the light pulse is 110 Lux and the duration is 1.5 ms, or the illuminance of the light pulse is 120 Lux and the duration is 2 ms, or the illuminance of the light pulse is 130 Lux and the duration is 2.5 ms, or the illuminance of the light pulse is 140 Lux and the duration is 3 ms, or the illuminance of the light pulse is 150 Lux and the duration is 3.5 ms, and a good effect is generated in triggering power-on of the power supply unit of the optical signal reception control device.

Referring to a principle diagram of an optical signal reception control device in FIG. 3-2, an optical signal reception control device is further provided in this embodiment. In an exemplary implementation manner of this embodiment, the optical signal reception control device includes an optical signal receiving unit 1c configured to receive an optical signal, a control unit 2c configured to encrypt an electrical signal converted by the optical signal receiving unit 1c, a power supply unit 3c configured to provide a power supply, and a photoelectrical trigger circuit 4c configured to trigger power-on of the power supply unit 3c. The optical signal reception control device may be an optical intelligent lock, an electrical lock, an industrial device, a locker, or an office device.

The photoelectric trigger circuit 4c includes: an optical-to-electrical conversion unit 41c, configured to convert an optical signal into an electrical signal; an isolator 42c, configured to impede a direct current; an output end 44c, configured to output a control signal. The optical-to-electrical conversion unit receives a light pulse signal and converts the light pulse signal into an electrical pulse signal. The electrical pulse signal leads to a potential difference between two ends of the isolator. The isolator discharges electricity, and the output end 44c outputs a signal to trigger power-on of the power supply unit of the optical signal reception control device.

It should be understood that the optical signal receiving unit 1c is a photodiode or another apparatus capable of receiving visible light. The control unit 2c is a single-chip microcomputer, and the power supply unit 3c includes a power supply circuit and a battery. The battery may be a lithium battery, a nickel-cadmium battery or a nickel metal hydride battery.

In an existing light switch startup technology, a light switch is generally powered on or powered off based on light strength, that is, powered on when the light is strong and powered off when the light is weak. However, when a door lock is in use, the light strength change range is wide indoors or outdoors. Therefore, the circuit is turned on automatically once the light is strong, which consumes much electricity. In this embodiment, a photoelectric trigger circuit is added to an optical signal reception control device, and therefore, a power supply unit of the optical signal reception control device is powered on when receiving a light pulse signal, and is also in a sleep state when there is no light pulse signal even if the light is relatively strong. Power consumption is very low in the sleep state; therefore, the optical signal reception control device with the photoelectric trigger circuit is energy-saving and environment-friendly.

According to an encoding method of an optical signal reception control device, stroboscopic visible light emitted by a flash lamp of a mobile phone or stroboscopic visible light emitted by the optical signal transmitting apparatus can be encoded, and the number of high levels is used to represent a 2-bit signal. The 2-bit signal is classified into four types: 00, 01, 10, and 11. When the number of high level is 0 which means a low level, it can also represent a 2-bit signal. At the time of encoding, the number of high levels is in a one-to-one correspondence with the 2-bit signal. The 2-bit signals are divided in groups. Four groups of 2-bit signals represent one byte. The sending period of each group of signals is exactly the same. Different signals are sent according to a fixed period, and the sending time of signals does not change with difference of the sent signal, thereby reducing the latency of the low level in each group of signals and accomplishing more stable and faster sending of signals.

The sending period of each group of signals is preferably 57-63 ms. A sum of the latency of the low level in each group of signals, the latency of the low level between different groups of signals and the latency of the high level of each group of signals is equal to the sending period of each group of signal. The latency of the high level is greater than 1 ms, and is preferably 5 ms or 3 ms.

The latency of the low level in each group of signals is not greater than a half of the latency of the low level between different groups of signals. Two different groups of signals may be distinguished according to the latency of the low level between different groups of signals.

When the frequency of a stroboscopic visible light emitted by the flash lamp of the mobile phone or the optical signal transmitting apparatus is greater than 1 ms, and is preferably 5 ms or 10 ms, the stroboscopic visible light may be encoded by using the foregoing encoding method.

In this embodiment provides a light-controlled receiving end decoding method in a decoding method for an optical signal reception control device. With reference to the foregoing encoding method and FIG. 3-3 which is a step-by-step flowchart of a decoding method for an optical signal reception control device in this embodiment, the decoding method includes the following steps:

M1. using a rising edge of a signal as a start part of a high level, starting, by a control unit of the optical signal reception control device, timing after detecting the rising edge, and when duration of the high level is greater than 1 ms, recording, by the control unit, the number of high levels;

M2. using a falling edge of a signal as a start part of a low level, starting, by the control unit of the optical signal reception control device, timing when detecting the falling edge, and when duration of the low level is greater than 20 ms, automatically recording, by the control unit, an end of a group of signals.

M3. calculating, by the control unit of the optical signal reception control device, a period of each group of signals by using a synchronization clock, and identifying a low-level signal according to the period of each group of signals.

It should be understood that, when duration of the low-level signal is greater than 75 ms, and is preferably 80 ms, receiving of the signal is complete or receiving of the signal is interrupted, and the control unit of the optical intelligent lock restarts detecting signals.

When a high-level signal appears in 40 ms after completion of a group of signals, the light-controlled receiving end rectifies a clock according to the time of the high-level signal, and records the high-level signal into a next group of signals automatically.

When no high-level signal appears in 60 ms after completion of a group of signals, the light-controlled receiving end determines that a received signal is a low-level signal of a next group of signals.

The decoding method in this embodiment is applicable to decoding of a stroboscopic visible optical signal emitted by an optical signal transmitting apparatus or a mobile phone.

Meanings represented by the number of high levels and low levels of each group of signals recorded by the light-controlled receiving end are defined according to a coding scheme of the visible optical signal of the optical signal reception control device.

Example 3-1

It is assumed that the low level represents 00, one high level represents 01, two high levels represent 10, and three high levels represent 11, the signal sending period is 59 ms fixedly, and the latency of the high level is 5 ms. Then, for a schematic diagram of a signal sent according to the encoding method, refer to FIG. 3-4. In the schematic diagram of the signal in this example, a low level represents a 2-bit signal, which reduces the number of high levels and makes the signal more stable. In addition, the total sending time of the signal does not change with a difference of the sent signal. The signal sent by the optical signal reception control device in this example is 01110010, and the optical signal reception control device decodes the signal:

M1. A rising edge is used as a start part of a high level, timing is started after the optical signal reception control device detects the rising edge, and the optical signal reception control device records the number of high levels when duration of the high level is 1.5 ms, where the number of high levels is 1, 3, 0, and 2.

M2. A falling edge is used as a start part of a low level, timing is started when the optical signal reception control device detects the falling edge, and the optical signal reception control device automatically records an end of a group of signals when duration of the low level is 25 ms. The duration of the low level of all the four groups of signals in this embodiment exceeds 20 ms. Therefore, the light-controlled receiving end can automatically record the end of a group of signals. When no high-level signal appears in 60 ms after completion of a group of signals, the optical signal reception control device determines that the received signal is a low-level signal 00 of a next group of signals.

M3. The optical signal reception control device calculates a period of each group of signals by using a synchronization clock. In this example, a fixed signal period of 59 ms in example 3-1 is exemplary. Therefore, the decoded signal is 01110010.

Example 3-2

It is assumed that one high level represents 00, two high levels represent 10, three high levels represent 01, and four high levels represent 11, the signal sending period is 63 ms fixedly, and the latency of the high level is 3 ms. Then, for a schematic diagram of a signal sent according to the encoding method, refer to FIG. 3-5. In the schematic diagram of the signal in this example, the signal sent in this example is 00100111, and the optical signal reception control device decodes the signal:

M1. A rising edge is used as a start part of a high level, timing is started after the optical signal reception control device detects the rising edge, and the optical signal reception control device records the number of high levels when duration of the high level is 1 ms, where the number of high levels is 1, 2, 3, and 4. When a high-level signal appears in 40 ms after completion of a group of signals, the optical signal reception control device rectifies a clock according to the time of the high-level signal, and records the high-level signal into a next group of signals automatically.

M2. A falling edge is used as a start part of a low level, timing is started when the optical signal reception control device detects the falling edge, and the light-controlled receiving end automatically records an end of a group of signals when duration of the low level is 22 ms. In this example, the duration of the low level of all the four groups of signals exceeds 20 ms. Therefore, the optical signal reception control device can record the end of a group of signals automatically.

M3. The optical signal reception control device calculates a period of each group of signals by using a synchronization clock. In this example 3-2, the signal period is 63 ms fixedly. Therefore, the decoded signal is 00100111.

The foregoing example is merely illustrative. At the time of encoding, one high level may also represent 10 or 01, and two high levels may also represent 00 or 11. That is, the one-to-one correspondence between the number of high levels and the 2-bit signal may be set according to requirements of the user. Therefore, the decoding method for the optical signal reception control device in this embodiment may be adjusted according to the coding scheme.

It should be noted that the present invention may independently protect solutions described in this embodiment, or protect a solution that combines one or more solutions in the solutions described in this embodiment with one or more solutions in the solutions described in other embodiments.

It should be noted that the present invention may independently protect solutions described in this embodiment, or protect a solution that combines one or more solutions in the solutions described in this embodiment with one or more solutions in the solutions described in other embodiments.

In addition, a person skilled in the art should understand that each module or each step of the present invention described above may be implemented by a universal computing apparatus. They may be centralized on a single computing apparatus, or distributed on a network formed of multiple computing apparatuses. Optionally, they may be implemented by program code that can be executed by a computing apparatus. Therefore, they may be stored in a storage apparatus and executed by the computing apparatus.

In addition, in specific circumstances, the illustrated or described steps may be performed in a sequence different from that described herein, or they each may be made into an integrated circuit module, or multiple modules or steps of them may be made into a single integrated circuit module for the purpose of implementation. Therefore, the present invention is not limited to any specific combination of hardware and software.

The foregoing descriptions are merely exemplary embodiments of the present invention, but are not intended to limit the present invention. Persons skilled in the art understand that the present invention may have various modifications and variations. Any modification, equivalent replacement, and improvement made without departing from the principles of the present invention shall fall within the protection scope of the present invention.

What is claimed is:

1. A optical signal processing device, wherein the optical signal processing device is an optical signal reception control device, and the optical signal reception control device comprises an optical signal receiving unit, a control unit connected to the optical signal receiving unit, a power supply unit connected to the control unit, and a photoelectric trigger circuit that is connected between the control unit and the power supply unit and configured to trigger power-on of the power supply unit of the optical signal reception control device, wherein the photoelectric trigger circuit is the power control apparatus, and the power supply is the power supply unit, and the photoelectric trigger circuit comprises:
   an optical-to-electrical conversion unit, configured to convert a light pulse into an electrical pulse signal;
   an isolator, configured to generate a potential difference by using the electrical pulse signal, and release an electrical signal;
   an output end, configured to: according to the electrical signal, trigger power-on of a power supply unit connected to the output end; and
   a signal amplification circuit, connects the isolator and the output end, the signal amplification circuit comprises a first triode and a second triode connected to the first triode, wherein
   the optical signal is the light pulse;
   wherein the optical-to-electrical conversion unit is connected to one end of the isolator, and the other end of the isolator is connected to a base of the first triode, an emitter of the first triode is connected to a base of the second triode, both the emitter of the first triode and an emitter of the second triode are grounded, and a collector of the second triode is connected to the output end.

2. The optical signal processing device according to claim 1, wherein the isolator is connected between the optical-to-electrical conversion unit and the output end.

3. The optical signal processing device according to claim 1, wherein the isolator is a DC blocking capacitor.

4. The optical signal processing device according to claim 1, wherein the output end is a conductor.

5. The optical signal processing device according to claim 1, wherein when illuminance is greater than or equal to 100 Lux and lasts for 1 ms or more, the light pulse triggers power-on of the power supply unit of the optical signal reception control device.

6. The optical signal processing device according to claim 1, further comprising a demodulation unit configured to demodulate a visible optical signal.

7. A decoding method for an optical signal reception control device, applied to an optical signal reception control device according to any one of claim 1, wherein the method comprises the following steps:
   M1. using a rising edge of a signal as a start part of a high level, starting, by a control unit of the optical signal reception control device, timing after detecting the rising edge, and when duration of the high level is greater than first preset duration, recording, by the control unit, the number of high levels;
   M2. using a falling edge of a signal as a start part of a low level, starting, by the control unit of the optical signal reception control device, timing when detecting the falling edge, and when duration of the low level is greater than second preset duration, automatically recording, by the control unit, an end of a group of signals; and
   M3. calculating, by the control unit of the optical signal reception control device, a period of each group of signals by using a synchronization clock, and identifying a low-level signal according to the period of each group of signals.

8. The decoding method for an optical signal reception control device according to claim 7, wherein when a high-level signal occurs in a first preset time segment after completion of a group of signals, the optical signal reception control device rectifies a clock according to time of the high-level signal, and records the high-level signal into a next group of signals automatically.

9. The decoding method for an optical signal reception control device according to claim 7, wherein when no high-level signal occurs in a second preset time segment after completion of a group of signals, the optical signal reception control device determines that a received signal is a low-level signal of a next group of signals.

10. The decoding method for an optical signal reception control device according to claim 7, wherein the decoding method is applicable to decoding of a stroboscopic visible optical signal emitted by an optical signal transmitting apparatus or a mobile phone.

11. The decoding method for an optical signal reception control device according to claim 7, wherein meanings represented by the number of high levels and low levels of each group of signals recorded by the optical signal reception control device are defined according to a coding scheme of the visible optical signal sent by the optical signal transmitting apparatus.

12. The decoding method for an optical signal reception control device according to claim 7, wherein when duration of the low-level signal is greater than third preset duration, receiving of the signal is complete or receiving of the signal is interrupted, and the control unit of the optical intelligent lock restarts detecting signals.

13. A optical signal processing device, wherein the optical signal processing device is an intelligent light-controlled door lock, wherein the intelligent light-controlled door lock comprises the power supply, a power control module, an optical signal receiving module, and a microprocessor module; the power supply is configured to provide electric energy; the power control module is the power control apparatus, and the power control module comprises a photodiode, a signal amplifier, and a field effect transistor; the photodiode is configured to sense the optical signal and generate a current signal, the signal amplifier is configured to amplify the current signal, and the field effect transistor is configured to control power-on and power-off of the power supply according to the amplified current signal; the optical signal receiving module is configured to convert an optical signal, which is transmitted by a light-controlled key and comprises ID information, into an electric signal; and the microprocessor module is configured to control opening or closing of a door lock according to the electric signal;

wherein the intelligent light-controlled door lock further comprises an equilibrium shaping module, and the equilibrium shaping module is configured to eliminate intersymbol interference and rectify a pulse waveform for the signal output by the optical signal receiving module.

14. The optical signal processing device according to claim 13, wherein the intelligent light-controlled door lock further comprises a protocol conversion module, and the protocol conversion module is configured to perform protocol conversion for the ID, and then transmit the ID to a host computer.

15. The optical signal processing device according to claim 14, wherein the intelligent light-controlled door lock further comprises a signal demodulation module, and the signal demodulation module is configured to demodulate a signal output by the optical signal receiving module, and transmit the signal to the microprocessor module.

16. The optical signal processing device according to claim 15, wherein the intelligent light-controlled door lock further comprises a decoding module, and the decoding module is configured to decode a digital signal of a CMI code transmitted by the optical signal receiving module into a digital signal of an NRZ code.

17. The optical signal processing device according to claim 13, wherein the equilibrium shaping module comprises an operational amplifier and a comparer that are electrically connected to each other, wherein an input end of the operational amplifier and an input end of the comparer are both electrically connected to an output end of the optical signal receiving module, and an output end of the comparer is electrically connected to the decoding module.

18. The optical signal processing device according to claim 13, wherein the optical signal receiving module comprises a photodiode, a signal amplifier, and a bandpass filter, wherein the photodiode and the bandpass filter are both electrically connected to the signal amplifier.

* * * * *